US010327524B2

(12) United States Patent
Dining et al.

(10) Patent No.: US 10,327,524 B2
(45) Date of Patent: Jun. 25, 2019

(54) PROTECTIVE CASE FOR PORTABLE ELECTRONIC DEVICE

(71) Applicant: cradl, ltd., Boulder, CO (US)

(72) Inventors: Elizabeth Joy Dining, Boulder, CO (US); Erin Joy Watt, Boulder, CO (US); Zachary Conrad, Denver, CO (US); Cameron James Brown, Vail, CO (US); Jeremy Kerbs, Westminster, CO (US)

(73) Assignee: Jefferson Street Holdings Intellectual Property, LLC, Boulder, CO (US)

( * ) Notice: Subject to any disclaimer, the term of this patent is extended or adjusted under 35 U.S.C. 154(b) by 0 days.

(21) Appl. No.: 15/291,985

(22) Filed: Oct. 12, 2016

(65) Prior Publication Data

US 2017/0027293 A1    Feb. 2, 2017

Related U.S. Application Data

(63) Continuation of application No. 15/043,227, filed on Feb. 12, 2016, now Pat. No. 9,480,319, which is a continuation of application No. 14/632,927, filed on Feb. 26, 2015, now Pat. No. 9,300,768.

(51) Int. Cl.
*B65D 85/00* (2006.01)
*A45C 11/00* (2006.01)
*A45F 5/00* (2006.01)
*H04B 1/3888* (2015.01)

(52) U.S. Cl.
CPC ............... *A45C 11/00* (2013.01); *A45F 5/00* (2013.01); *H04B 1/3888* (2013.01); *A45C 2011/002* (2013.01); *A45C 2011/003* (2013.01)

(58) Field of Classification Search
CPC .............. A45C 11/00; A45C 2011/002; A45C 2011/003; A45F 5/00; H04B 1/3888
USPC ............................ 206/320, 724, 45.2, 45.24
See application file for complete search history.

(56) References Cited

U.S. PATENT DOCUMENTS

| | | |
|---|---|---|
| D107,221 S | 11/1937 | Dewsbury |
| D331,922 S | 12/1992 | Gloton |
| D501,849 S | 2/2005 | Widiaman et al. |
| D508,182 S | 8/2005 | Colonello |
| D524,806 S | 7/2006 | Eguchi |
| D574,836 S | 8/2008 | Koh et al. |
| D575,056 S | 8/2008 | Tan |
| D593,635 S | 6/2009 | Fitzpatrick et al. |
| D606,525 S | 12/2009 | Chen et al. |
| D606,530 S | 12/2009 | Ferrari |
| D606,533 S | 12/2009 | de Jong et al. |
| D607,445 S | 1/2010 | Ferrari et al. |
| D616,429 S | 5/2010 | Nuovo |

(Continued)

OTHER PUBLICATIONS

U.S. Appl. No. 29/544,754, filed Nov. 5, 2015, Watt.

(Continued)

*Primary Examiner* — Rafael A Ortiz
(74) *Attorney, Agent, or Firm* — Lewis Brisbois Bisgaard & Smith LLP

(57) ABSTRACT

A case for an electronic device includes a rigid layer and a resilient layer. The rigid layer includes a plurality of turned edges. The resilient layer is disposed primarily on a first side of the rigid layer, wherein the resilient layer includes a plurality of enveloping edges that substantially envelop the turned edges.

50 Claims, 17 Drawing Sheets

(56) References Cited

U.S. PATENT DOCUMENTS

| | | | |
|---|---|---|---|
| D632,682 S | 2/2011 | Fahrendorff et al. | |
| D634,313 S | 3/2011 | Fitzpatrick et al. | |
| D641,347 S | 7/2011 | Fathollahi | |
| D646,672 S | 10/2011 | Fathollahi | |
| D654,043 S | 2/2012 | Pan et al. | |
| D655,699 S | 3/2012 | Bau | |
| D666,585 S | 9/2012 | Zheng et al. | |
| D668,660 S | 10/2012 | Norfolk | |
| D671,928 S | 12/2012 | Li | |
| D671,932 S | 12/2012 | Azoulay | |
| D674,801 S | 1/2013 | Wharram | |
| D685,360 S | 7/2013 | Chen et al. | |
| D685,776 S | 7/2013 | Bau | |
| D685,785 S | 7/2013 | Seoc et al. | |
| D687,427 S | 8/2013 | Peterson | |
| D689,851 S | 9/2013 | Chang et al. | |
| D703,648 S | 4/2014 | Magness et al. | |
| D704,684 S | 5/2014 | Yeh et al. | |
| D706,256 S | 6/2014 | Ward et al. | |
| D707,683 S | 6/2014 | Nam-Su | |
| D708,895 S | 7/2014 | Hoyord et al. | |
| D710,345 S | 8/2014 | Chang | |
| D712,389 S | 9/2014 | Namminga | |
| D713,831 S | 9/2014 | Kim et al. | |
| D716,280 S | 10/2014 | Macrina et al. | |
| D718,290 S | 11/2014 | Whitten et al. | |
| D723,017 S | 2/2015 | Song | |
| D724,596 S | 3/2015 | Sirichai | |
| D725,116 S | 3/2015 | Li | |
| D726,169 S | 4/2015 | Powell et al. | |
| D733,154 S | 6/2015 | Armstrong et al. | |
| D735,174 S | 7/2015 | Wengreen | |
| D735,184 S | 7/2015 | Lee et al. | |
| D737,522 S | 8/2015 | Lavigne et al. | |
| D742,868 S | 11/2015 | Odhwani et al. | |
| D742,869 S | 11/2015 | Odhwani et al. | |
| 9,300,768 B1 | 3/2016 | Watt et al. | |
| D755,188 S | 5/2016 | Burmester | |
| 9,399,316 B2 | 7/2016 | Chang | |
| D764,451 S | 8/2016 | Hung et al. | |
| D765,638 S | 9/2016 | Gaylord et al. | |
| 9,480,319 B2 | 11/2016 | Dining et al. | |
| 2009/0080153 A1 | 3/2009 | Richardson et al. | |
| 2010/0113111 A1 | 5/2010 | Wong et al. | |
| 2011/0228458 A1 | 9/2011 | Richardson et al. | |
| 2012/0294469 A1* | 11/2012 | Weaver, III | H04R 1/2857 381/334 |
| 2012/0325882 A1 | 12/2012 | Tages et al. | |
| 2013/0032617 A1* | 2/2013 | Adelman | A45F 5/00 224/191 |
| 2013/0292269 A1 | 11/2013 | Taes | |
| 2013/0292378 A1 | 11/2013 | Tages | |
| 2014/0078671 A1 | 3/2014 | Hong | |
| 2014/0315603 A1 | 10/2014 | Fathollahi et al. | |
| 2015/0194995 A1* | 7/2015 | Fathollahi | H04B 1/3888 455/575.8 |
| 2015/0207911 A1 | 7/2015 | Lin | |
| 2016/0044148 A1 | 2/2016 | Pizzo et al. | |
| 2017/0034932 A1* | 2/2017 | Rostami | H02J 7/0045 |

OTHER PUBLICATIONS

U.S. Appl. No. 29/544,756, filed Nov. 5, 2015, Watt.
U.S. Appl. No. 29/544,757, filed Nov. 5, 2015, Kellog.
International Search Report and Written Opinion for International (PCT) Patent Application No. PCT/US16/19364, dated May 2, 2016, 8 pages.
Official Action for U.S. Appl. No. 14/632,927, dated Oct. 27, 2015, 10 pages.
Notice of Allowance for U.S. Appl. No. 14/632,927, dated Nov. 25, 2015 15 pages.
Notice of Allowance for U.S. Appl. No. No. 15/043,227, dated Sep. 16, 2016 11 pages.
Official Action for U.S. Appl. No. 29/544,754, dated Sep. 26, 2016, 11 pages.
Official Action for U.S. Appl. No. 29/544,754, dated Feb. 7, 2017 7 pages.
Official Action for U.S. Appl. No. 29/544,756, dated Sep. 26, 2016 11 pages.
Official Action for U.S. Appl. No. 29/544,756, dated Feb. 6, 2017 7 pages.
Official Action for U.S. Appl. No. 29/544,757, dated Sep. 26, 2016 11 pages.
Official Action for U.S. Appl. No. 29/544,757, dated Feb. 3, 2017 7 pages.
Complaint concerning infringement of patent U.S. Pat. No. 9,480,319. *Jefferson Street Holdings Intellectual Property LLC* v. *SEIDIO*. Civil Action No. 5:18-cv-110. U.S. District Court for the S.D. of TX. Aug. 3, 2018.
Rearth Ringke SLIM Case for the iPhone 4/4s. https://www.youtube.com/watch?v=23puVDvuT78. Dec. 26, 2011.
Rearth Ringke Slim for Samsung Galaxy Nexus Case Review. https://www.youtube.com/watch?v=XT5cgDUMZNw. Feb. 19, 2012.
Early Adopter _ Reviews, Galaxy S2 LTE Case Ringke Slim Ringke Slim CD Man. http://cdmanii.com/2646. Nov. 17, 2011. (Machine Translated from Korean).
Complaint concerning infringement of patent U.S. Pat. No. 9,480,319. *Jefferson Street Holdings Intellectual Propert LLC* v. *TECH21 Inc*. Civil Action No. 5:18-cv-806. U.S. District Court for the W.D. of TX. Aug. 3, 2018.
Complaint concerning infringement of patent U.S. Pat. No. 9,480,319. *Jefferson Street Holdings Intellectual Property LLC* v. *AMZER Group Inc*. Civil Action No. 5:18-cv-111. U.S. District Court for the S.D. of TX. Aug. 3, 2018.
Amended complaint concerning infringement of patent U.S. Pat. No. 9,480,319. *Jefferson Street Holdings Intellectual Property LLC* v. *TECH21 UK Inc*. Civil Action No. 5:18-cv-806. U.S. District Court for the W.D. of TX. Nov. 2, 2018.
Complaint concerning infringement of patent U.S. Pat. No. 9,480,319. *Jefferson Street Holdings Intellectual Property LLC* v. *Rearth USA*. Civil Action No. 2:18-cv-338. U.S. District Court for the E.D. of TX. Aug. 3, 2018.

\* cited by examiner

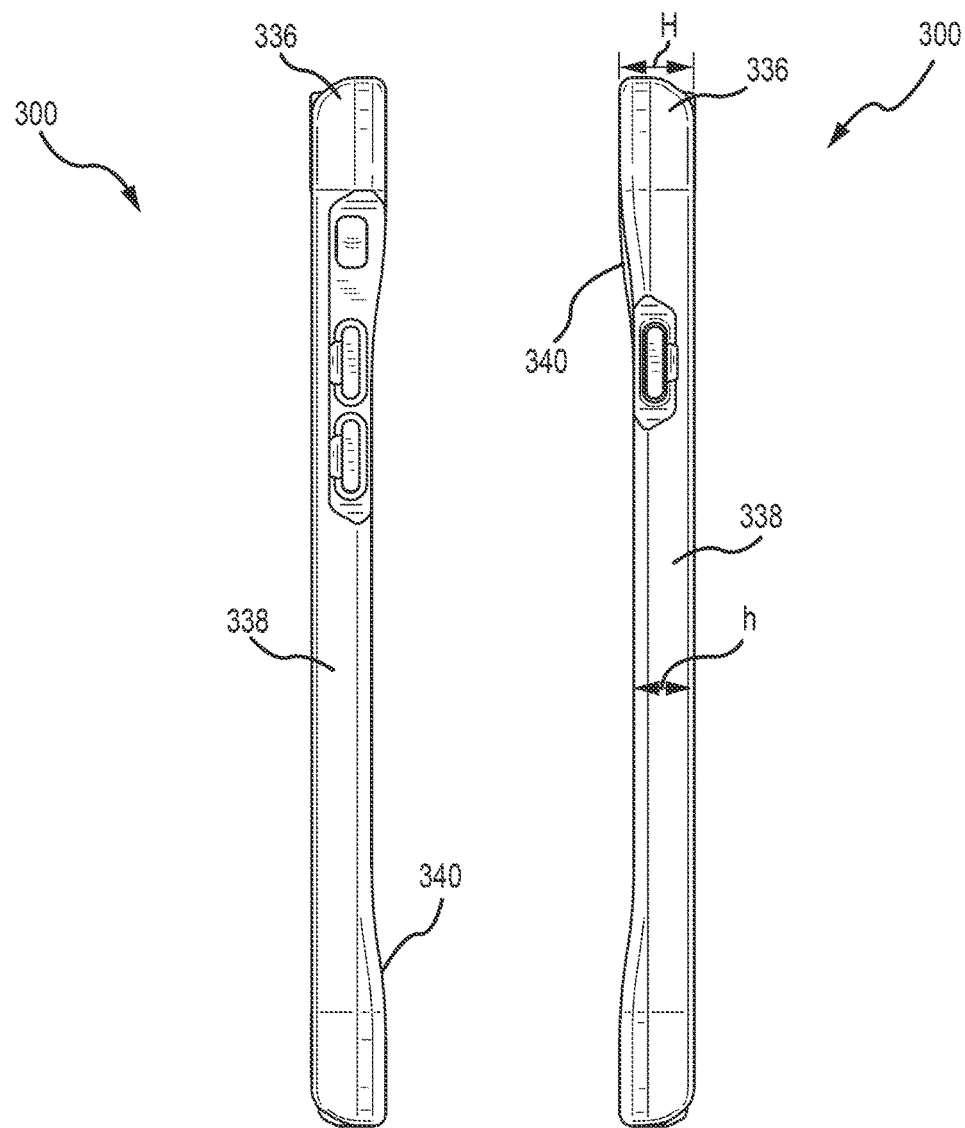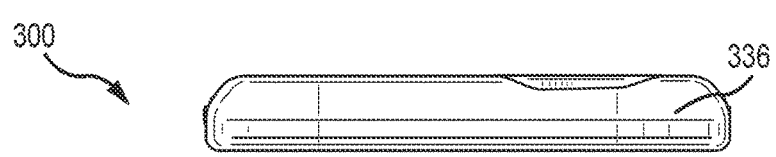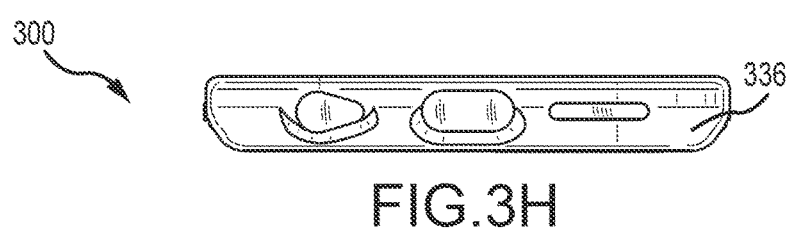

PROTECTIVE CASE FOR PORTABLE ELECTRONIC DEVICE

CROSS-REFERENCE TO RELATED APPLICATIONS

The present application is a continuation of U.S. patent application Ser. No. 15/043,227, filed Feb. 12, 2016, which is a continuation of U.S. patent application Ser. No. 14/632,927, filed Feb. 26, 2015, now issued U.S. Pat. No. 9,300,768, the entire disclosures of which are hereby incorporated by reference.

INTRODUCTION

Smartphones, tablets, personal digital assistants and other electronic devices are somewhat fragile. The housings and electronics located therein can be damaged by dropping, while screens can be scratched when placed face-down on a surface. A variety of protective cases that substantially surround the device are available. These cases, however, are often bulky, unsightly, and can limit access to the device screen or control buttons.

SUMMARY

In one aspect, the technology relates to a case for an electronic device, the case having: a rigid layer including a plurality of turned edges; and a resilient layer disposed primarily on a first side of the rigid layer, wherein the resilient layer includes a plurality of enveloping edges that substantially envelop the turned edges. In an embodiment, the rigid layer defines a central opening and further includes a plurality of rigid bridges at least partially spanning the central opening, wherein each of the plurality of rigid bridges include a rigid bridge width; and the resilient layer defines a central window and further includes a plurality of resilient bridges at least partially spanning the central window and substantially aligned with each of the plurality of rigid bridges, wherein each of the plurality of resilient bridges include a resilient bridge width less than the rigid bridge width. In another embodiment, each of the plurality of rigid bridges and each of the plurality of resilient bridges define a shape including at least one of a straight bar, a curved bar, a curvilinear bar, a substantially circular bar, a wave bar, and an ellipsoidal bar. In yet another embodiment, at least one of the plurality of rigid bridges extends between opposing edges of the central opening. In still another embodiment, at least one of the plurality of rigid bridges extends between adjacent edges of the central opening.

In another embodiment of the above aspect, at least one of the plurality of rigid bridges extends between a single edge of the central opening. In an embodiment, a first rigid bridge of the plurality of rigid bridges extends from a first edge of the central opening to a second rigid bridge of the plurality of rigid bridges. In another embodiment, the resilient layer includes: two short outer edges, each having a first height; and two long outer edges having lengths greater than the two short outer edges, wherein each of the two long outer edges has a second height less than the first height. In yet another embodiment, the resilient layer defines a taper from the first height to the second height. In still another embodiment, the resilient layer defines a step from the first height to the second height.

In another embodiment of the above aspect, includes a rigid tab extending therefrom, and wherein the resilient layer defines an aperture substantially aligned with at least a portion of the tab. In an embodiment, the portion of the tab includes an enlarged portion. In another embodiment, the enlarged portion includes an enlarged portion axis and wherein the aperture defines an aperture plane, and wherein the enlarged portion axis is misaligned from the aperture plane. In yet another embodiment, the rigid layer is at least one of ABS, PVC, polyethylene, silicone, and thermoplastic elastomer. In still another embodiment, the resilient layer includes at least one of silicone, rubber, and thermoplastic elastomer. In another embodiment, the rigid layer is rigid relative to the resilient layer.

In another aspect, the technology relates to A protective case for an iPhone 6 smartphone, wherein the protective case defines a plurality of gaps on a surface of the protective case, wherein at least one of a logo and a word is visible through at least one of the plurality of gaps.

BRIEF DESCRIPTION OF THE DRAWINGS

There are shown in the drawings, embodiments which are presently preferred, it being understood, however, that the technology is not limited to the precise arrangements and instrumentalities shown.

FIGS. 3A-3H are various views of a protective case for an electronic device in accordance with another embodiment of the technology.

DETAILED DESCRIPTION

Figure 1A:
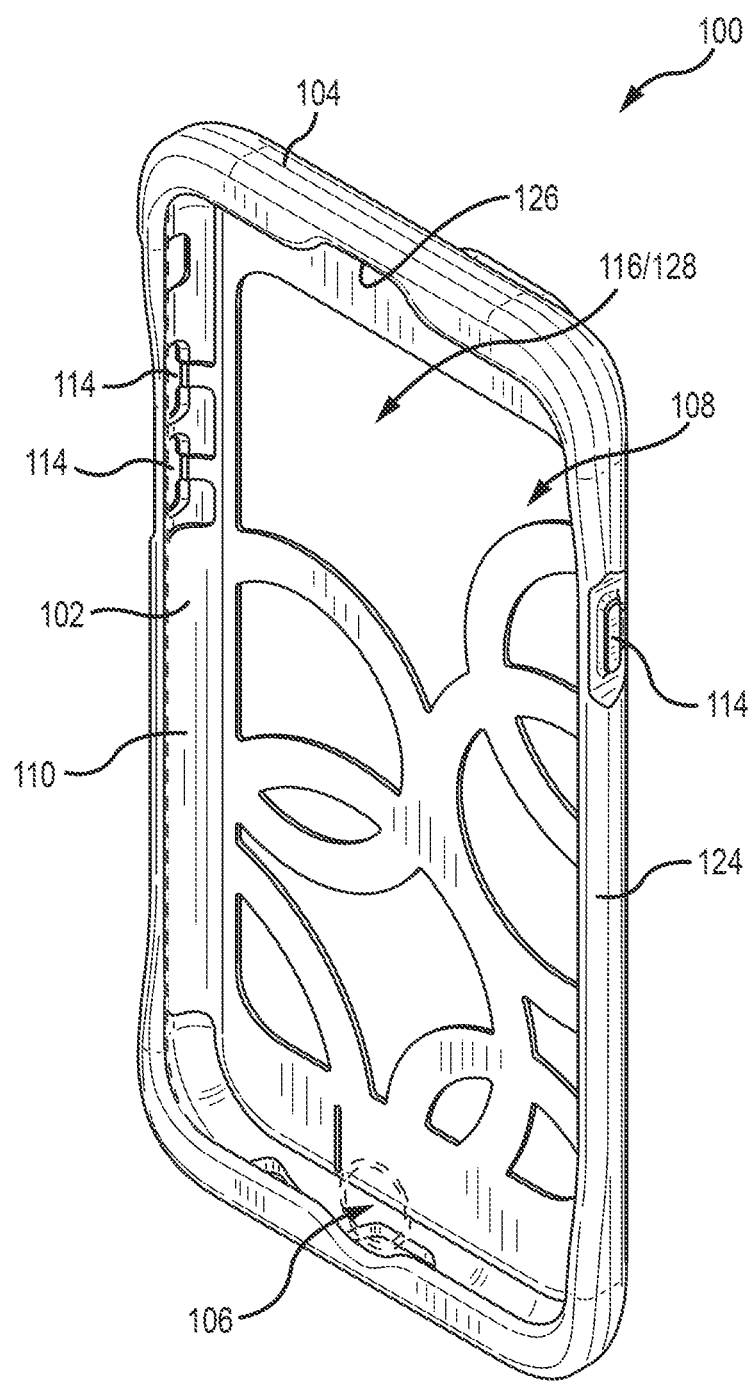
FIG. 1A is a perspective view of a protective case for an electronic device in accordance with one embodiment of the technology.
Figure 1B:
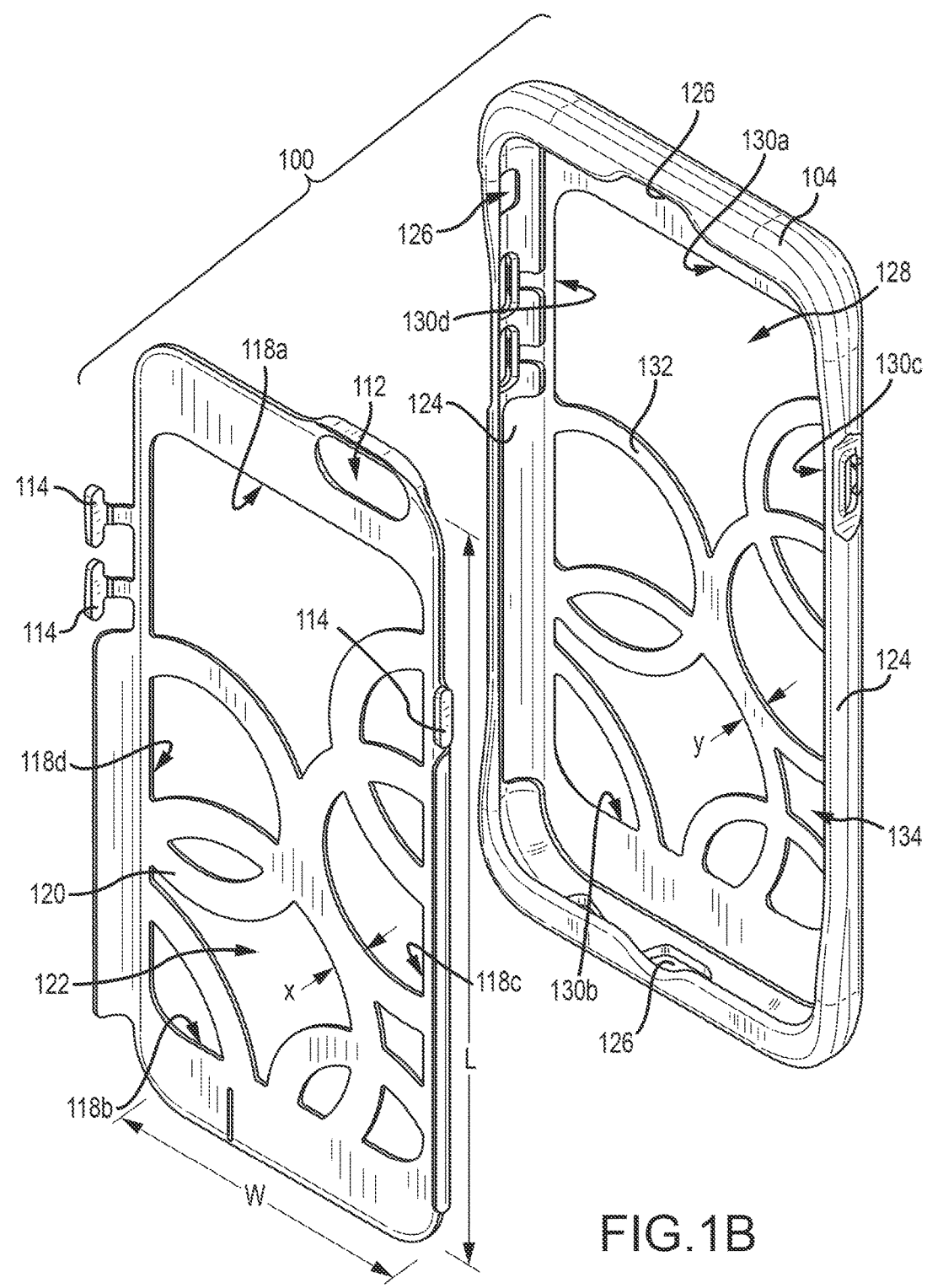
FIG. 1B is an exploded perspective view of the protective case of FIG. 1A.
Figure 1C:
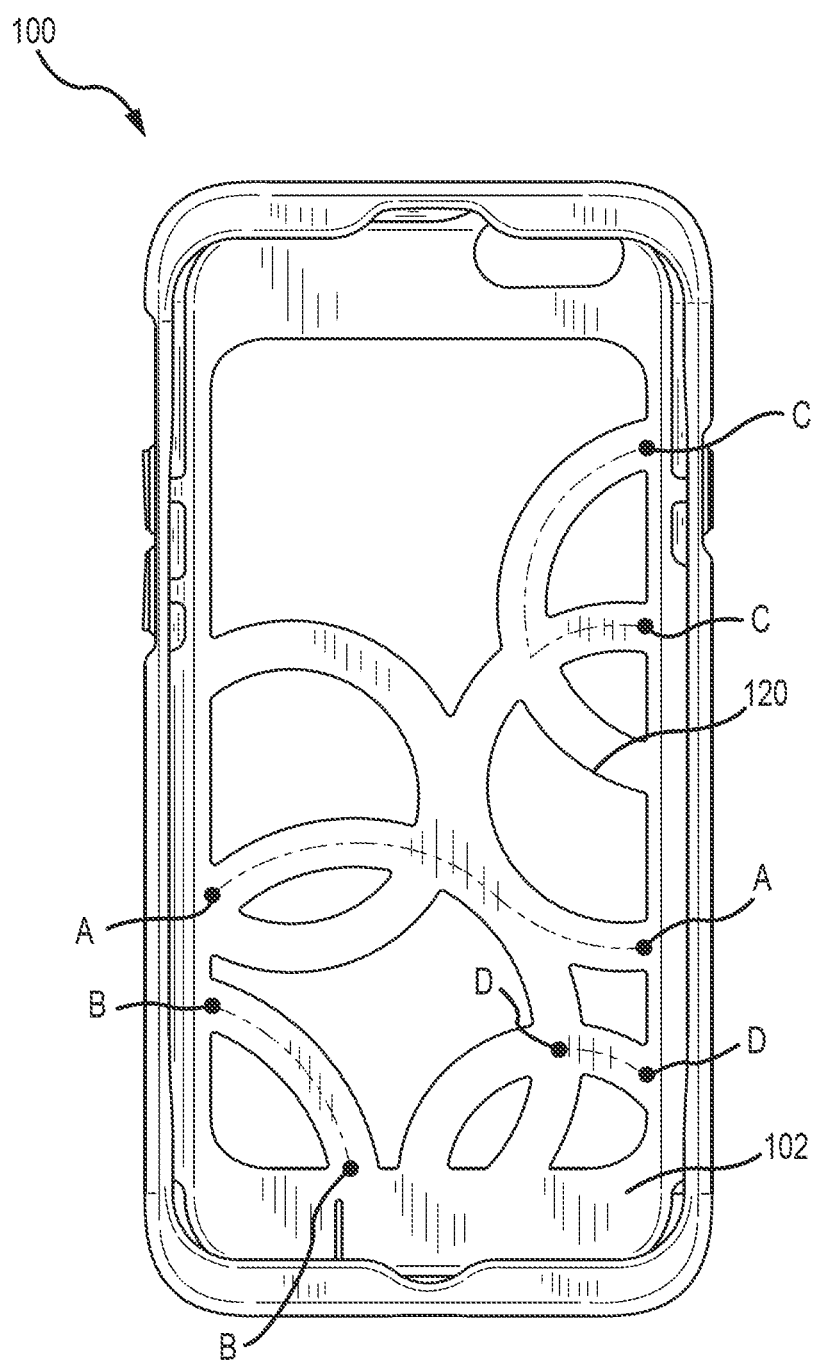
FIGS. 1C-1H are various views of the protective case of FIG. 1A.
Figure 1D:
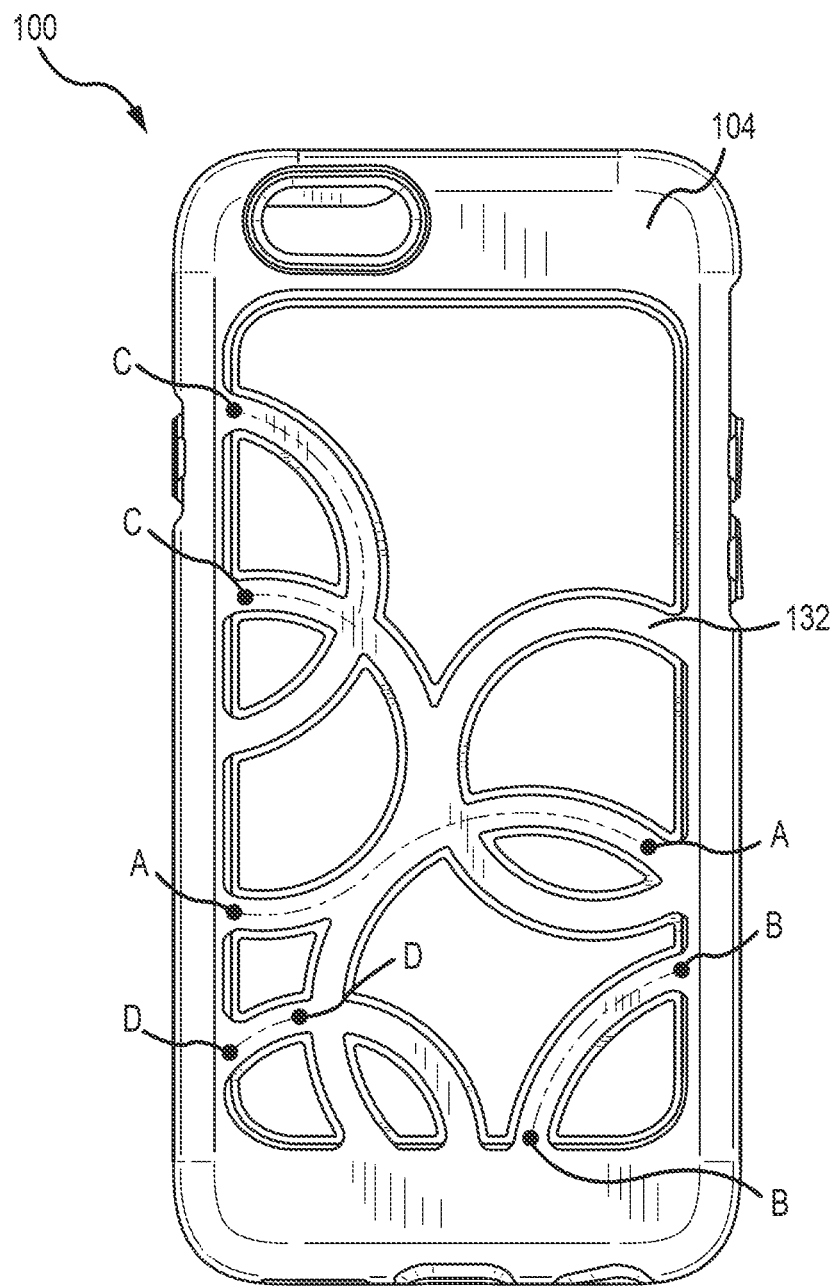
Figures 1E, 1F:
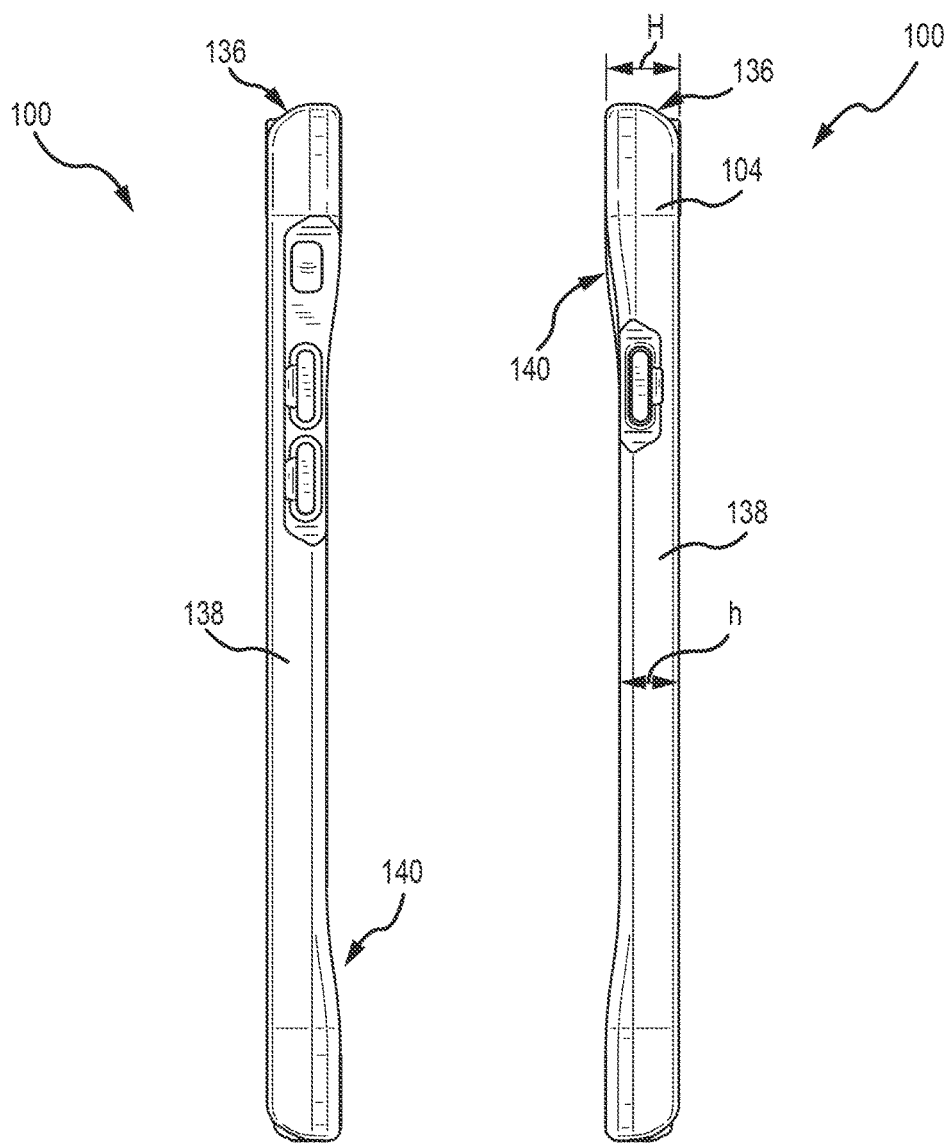
Figure 1G:
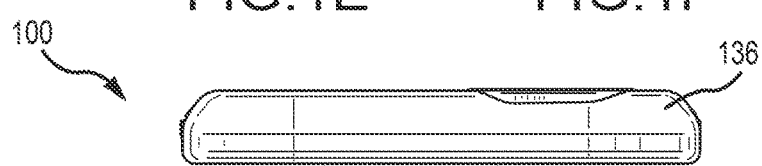
Figure 1H:
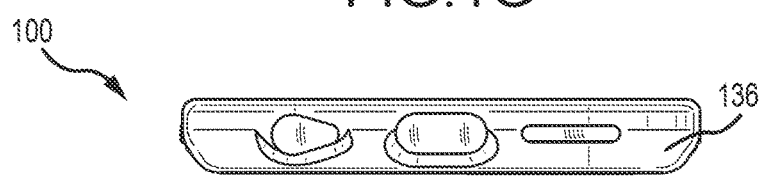

FIGS. 1A-1H are various view of a protective case 100 for an electronic device in accordance with one embodiment of the technology. FIGS. 1A-1H are described simultaneously and not all components or parts described herein are necessarily identified in every figure. The protective case 100 includes two layers, an inner rigid layer 102 or structure and an outer resilient layer 104 or shell. The case 100 is configured to substantially surround a smartphone, tablet, personal digital assistant, or other electronic device. An edge of the smartphone, and a lower, central button 106 thereof are depicted in dashed lines in FIG. 1A. For clarity, however, the protective cases described herein will be described in the context of a smartphone such as an iPhone 6. Thus, the term "inner" refers to the layer that is generally closest to the smartphone. The term "outer" generally refers to the layer that is disposed on the opposite side of the inner layer from the smartphone. The inner layer 102 and outer layer 104 may form a completed unitary part and may be bonded with adhesive so as to prevent separation between the two layers. In an alternative embodiment, one of the layers (i.e., the inner layer 102) may first be formed through known injection molding processes, then placed in a mold for the outer layer 104, which is then formed along with the inner layer 102 into a single unitary part, where the two layers are bonded due to an interaction between the materials of the two layers.

The inner layer 102 is formed of a generally rigid plastic such as ABS, PVC, polyethylene, silicone, thermoplastic elastomer (TPE), or other like plastics. Other materials, including metals such as titanium or aluminum may also be utilized. The inner layer 102 is configured to protect the smartphone when placed in the receiver 108 of the case 100 by effectively forming an exoskeleton to absorb and distribute impacts along the inner layer 102. Since the inner layer 102 is at least partially deformed during insertion of the smartphone into the receiver 108, materials that are elastically deformable without breaking may be desirable.

The outer layer 104 is formed of a generally resilient material such as silicone, rubber, and TPE. As used herein, the terms "rigid" and "resilient" describe material properties of the two layers relative to each other. That is, the rigid material utilized in the inner layer 102 is generally more rigid than the resilient material used in the outer layer 104. Thus, the outer layer 104 and the inner layer 102 may be manufactured of the general type of material, but due to manufacturing techniques, use of additives, etc., the materials of the layers may display different properties. The outer layer 104 is configured to cushion the smartphone and therefore dampen shocks and strikes that may occur when the smartphone is dropped or otherwise strikes a hard surface such as a floor or sidewalk. Additionally, the outer layer 104 may be manufactured of a material or coated with a layer that resists scuffing. The relative softness of the outer layer 104 prevents the smartphone from sliding on smooth surfaces, such as tables, automobile dashboards, etc. Resistance to sliding also helps reduce the likelihood of damage to the smartphone, since the device is less likely to slide off a surface when acted upon by an external force, such as a stray elbow or a curious pet. Additionally, the resilient outer layer 104 helps ensure the smartphone may be gripped more easily.

The inner rigid layer 102 or structure is generally planar and includes a number of turned or curved outer edges 110. In the depicted embodiment, the turned edges 110 are disposed along the lengths L of the inner layer 102, although the turned edges 110 may alternatively or additionally be disposed along the width W of the inner layer 102. The turned edges 110 may provide support for the outer layer 104 proximate a lower side edge of the outer layer 104. Generally, the curvature of the turned edges 110 is configured to match the contours of the smartphone received in the receiver 108. The inner layer 102 may define one or more openings 112, recesses, apertures, or contours that leave uncovered elements of the smartphone such as the speaker, microphone, camera, charging port, audio jack, screen, buttons, etc. In other embodiments, such as that depicted, the inner layer 102 includes a number of tabs 114 integral therewith. The tabs 114 extend from the inner layer 102 and include a portion that is configured to be substantially aligned with one or more buttons disposed on the smartphone. The tabs 114 are configured so as to be elastically deformable such that a user of the device can actuate the associated button without having to remove the protective case 100. Further functionality of the tabs 114 is described in more detail below.

The inner layer 102 defines a central opening 116 that exposes a substantial portion of the received smartphone. The central opening 116 is defined by a plurality of edges 118. In the depicted embodiment, a top edge 118a is substantially unbroken while the bottom 118b, right 118c, and left 118d edges are broken by the intersection of one or more bridges 120. The bridges 120 at least partially span the central opening 116 and may be arranged for both decorative and functional purposes. The bridges 120 preserve rigidity of the inner layer 102 and provide a protective feature whereby loads generated by drops or strikes are distributed throughout the inner layer 102. The thickness of the bridges 120 also helps limit scratches to the back surface of the smartphone. The bridges 120 may be configured, sized, and arranged so as to leave a substantial portion of the rear surface of the smartphone exposed, so as to leave visible logos, labels, or other marks on the smartphone, via gaps 122 between the bridges 120. The gaps 122 result in a reduced amount of inner layer material required, which reduces product weight and material costs, while the bridges 120 still provide protection as described above. Additionally, the gaps 122 may aid in dissipation of heat generated by the device.

The bridges 120 define a bridge width X and may be formed in any number of shapes and sizes. For example, shapes such as straight bars, curved bars, curvilinear bars, substantially circular bars, wave-shaped bars, ellipsoidal bars, or other configurations may be utilized. In the depicted embodiment, curved bars are primarily utilized. A number of different configurations of bridges 120 that completely or partially span the central opening 116 are depicted in the figures. For example, bridge 120 defined by path A-A spans the central opening 116 from a first edge to an opposing edge thereof. The bridge 120 defined by path B-B spans the central opening 116 from a first edge to an adjacent edge thereof. The bridge 120 defined by path C-C spans the central opening 116 from a first location to a second location on a single edge of the central opening 116. Additionally, the bridge 120 defined by path D-D spans the central opening 116 from an edge of the central opening 116 to a second bridge 120 disposed within the central opening 116. Other bridge configurations are depicted further herein and still others are contemplated.

The outer resilient layer 104 or shell includes enveloping edges 124 that substantially surround or envelop the turned edges 110 of the inner layer 102. The enveloping edges 124 also envelope at least a portion of the smartphone received in the receiver 108, which allows the smartphone to be held in place within the receiver. In the depicted embodiment, the enveloping edges 124 are larger at the top and bottom edges of the smartphone. Generally, the curvature of the enveloping edges 124 is configured to match the contours of the smartphone received in the receiver 108. The outer layer 104 may define one or more openings 126, recesses, apertures, or contours that leave uncovered elements of the smartphone such as the speaker, microphone, camera, charging port, audio jack, screen, buttons, etc. In general, these openings 126, etc., are substantially aligned with corresponding openings 112 in the inner layer 102. Certain of these openings 126 are aligned with portions of the tabs 114 described above, leaving these tabs 114 accessible for actuation by a user of the device. Further structural relationships between the tabs 114 and associated openings 126 are described below.

Similar to the inner layer 102, the outer layer 104 also defines a central window 128 that exposes a substantial portion of the received smartphone. The central window 128 is defined by a plurality of edges 130. In the depicted embodiment, a top edge 130a is substantially unbroken while the bottom 130b, right 130c, and left 130d edges are broken by the intersection of one or more bridges 132. The bridges 132 at least partially span the central window 128 and may be arranged for both decorative and functional purposes. The bridges 132 provide cushioning for the smartphone. The thickness of the bridges 132 also helps limit scratches to the back surface of the smartphone. The bridges 132 may be configured, sized, and arranged so as to leave a substantial portion of the rear surface of the smartphone exposed, so as to leave visible logos, labels, or other marks on the smartphone, via gaps 134 between the bridges 132. The gaps 134 result in a reduced amount of outer layer material required, which reduces product weight and material costs, while the bridges 132 still provide protection as described above. Additionally, the bridges 132 are substantially aligned with an associated bridge formed on the inner layer 104. The gaps 122 may also aid in dissipation of heat generated by the device.

The width Y of the bridges 132 formed as part of the resilient outer layer 104 may be slightly narrower or less wide than the bridges 120 formed as part of the inner layer 102. Similarly, the edges 130 of the central window 128 may be slightly larger than those of the central opening 116 defined by the inner layer 102. These differences in width allow the inner layer 102 to be slightly visible beyond the outer layer 104, for aesthetic and other purposes. Bridge 132 shapes such as straight bars, curved bars, curvilinear bars, substantially circular bars, wave-shaped bars, ellipsoidal bars, or other configurations may be utilized. In the depicted embodiment, curved bars are primarily utilized. A number of different configurations of bridges 132 that completely or partially span the central opening are depicted in the figures. For example, bridge 132 defined by path A-A spans the central window 128 from a first edge to an opposing edge thereof. The bridge 132 defined by path B-B spans the central window 128 from a first edge to an adjacent edge thereof. The bridge 132 defined by path C-C spans the central window 128 from a first location to a second location on a single edge of the central window 128. Additionally, the bridge 132 defined by path D-D spans the central window 128 from an edge of the central window 128 to a second bridge 132 disposed within the central window 128. Other bridge configurations are depicted further herein and still others are contemplated.

The outer layer 104 is further configured to protect the screen of the smartphone while increasing accessibility thereto. In the depicted embodiment, the outer resilient layer 104 has different heights at different portions about its perimeter. For example, the portions 136 of the outer layer 104 at the short outer edges of the smartphone (e.g., the upper and lower edges) have a height H that is greater than the portions 138 of the outer layer 104 proximate the longer outer edges of the smartphone (e.g., the side edges), which have a height h. The increased height H at the upper and lower portions 136 allow the smartphone display to be raised from a surface when placed face-down thereon. This helps prevent scratches to the display. Additionally, the reduced height h at the side portions 138 allows the screen to be completely accessed by the user, for finger-swiping, icon selection, and other actions. Additionally, screens that extend very close to the side edges of the smartphone may be completely visible due to the reduced height h of the outer layer 104 at the side portions 138. In certain embodiments, the height h of the outer layer 104 is flush with the display of the smartphone. The transition 140 between the higher top/bottom height H and the lower side height h may be a smooth transition, as depicted, or a step.

Figure 2:
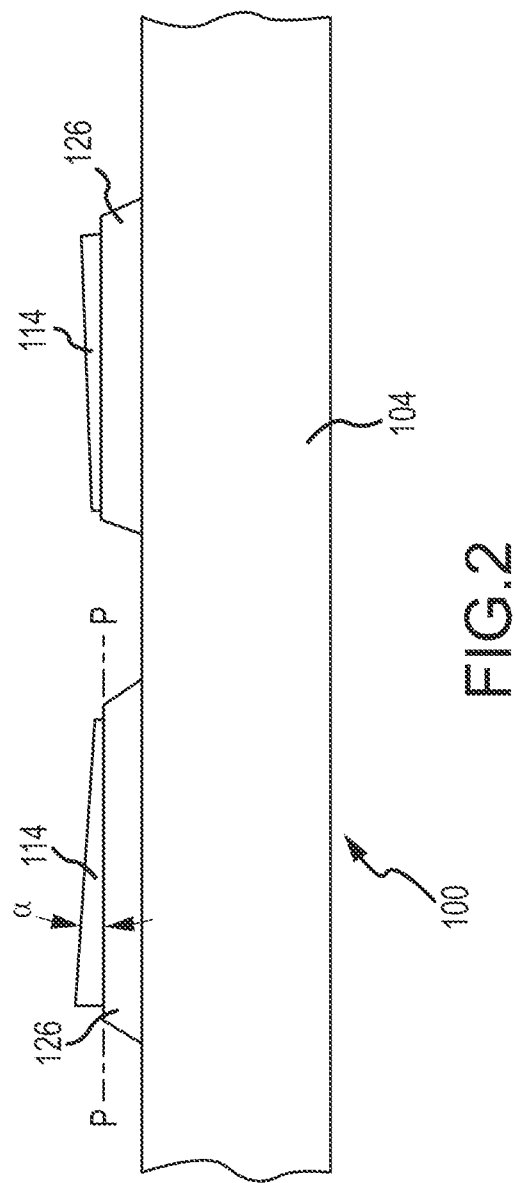
FIG. 2 is an enlarged partial side view of the protective case of FIG. 1A.
Figure 3A:
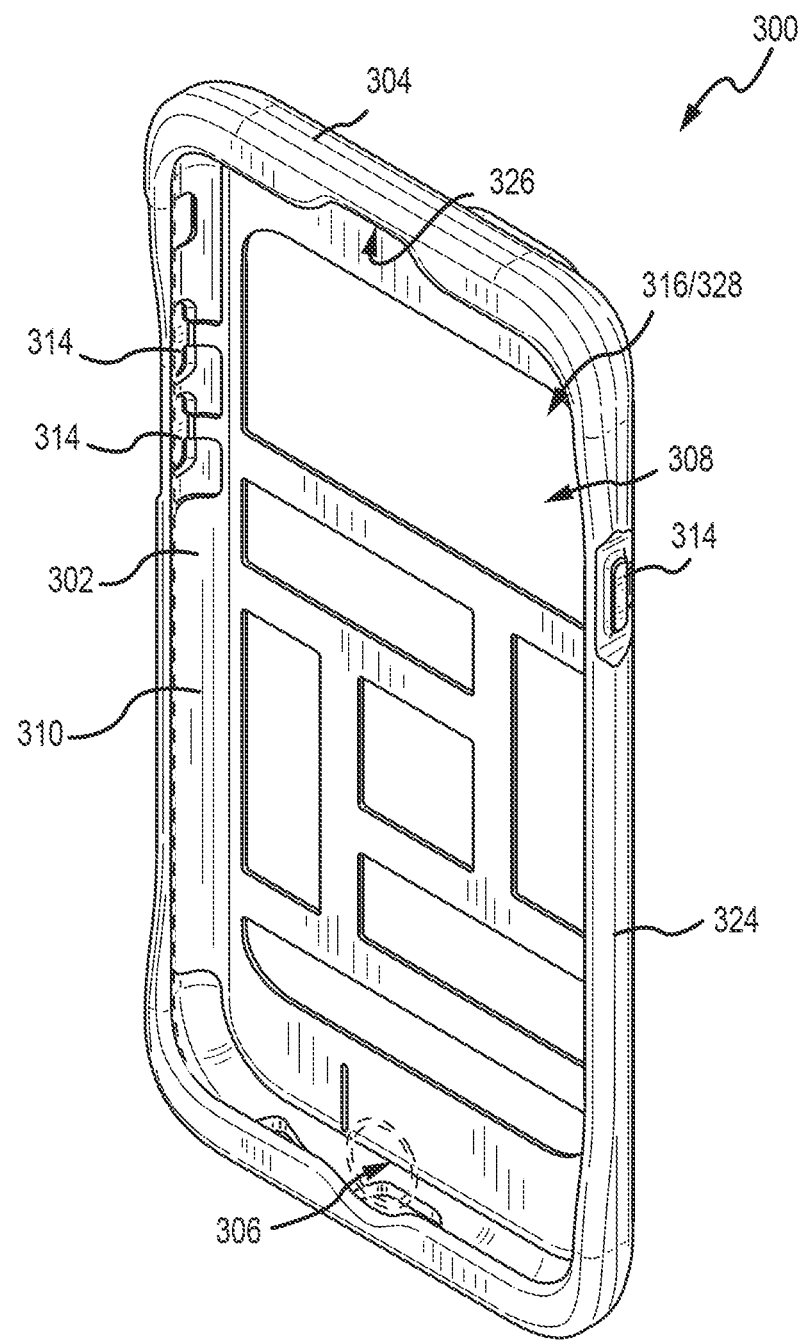
Figure 3B:
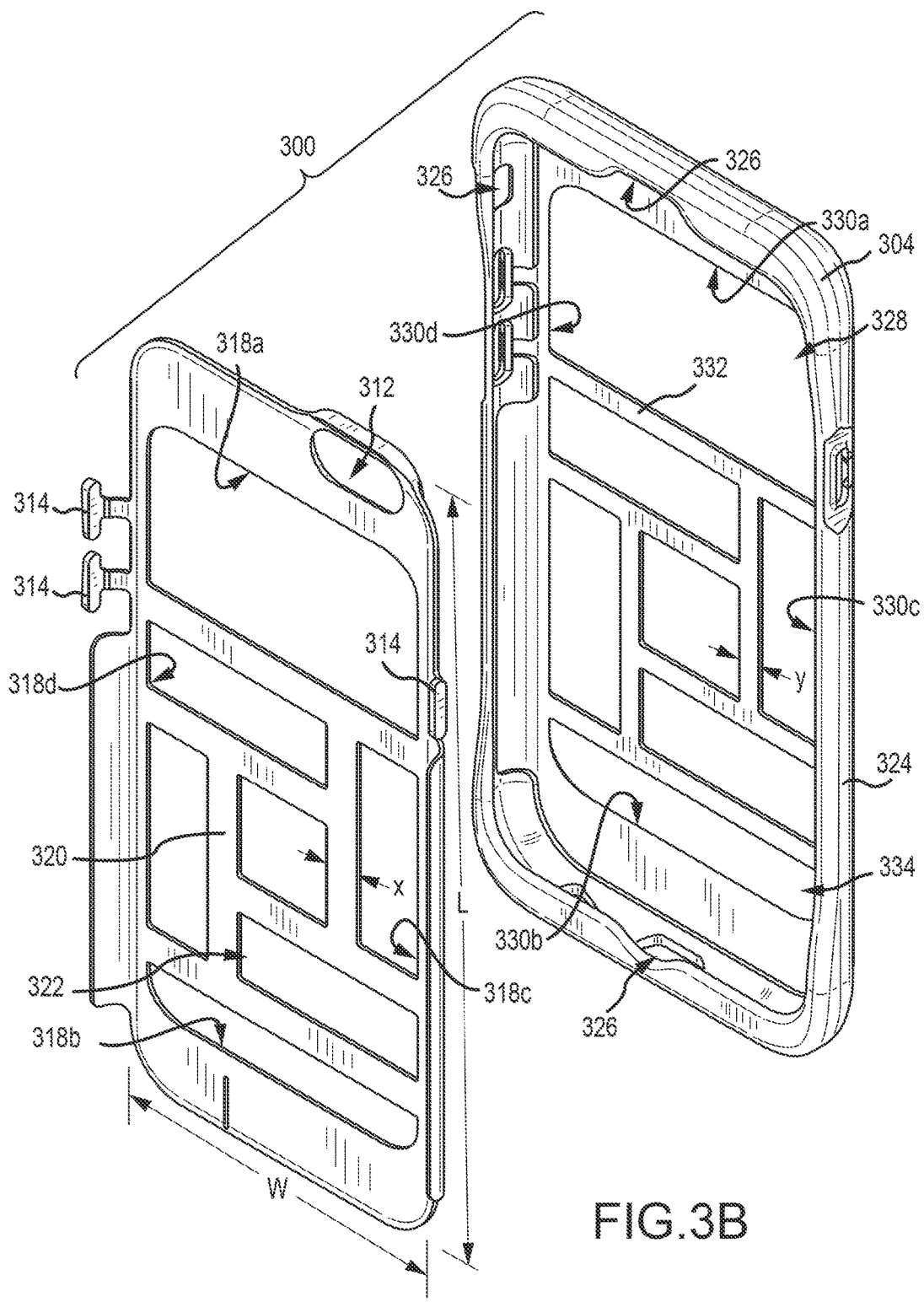
Figure 3C:
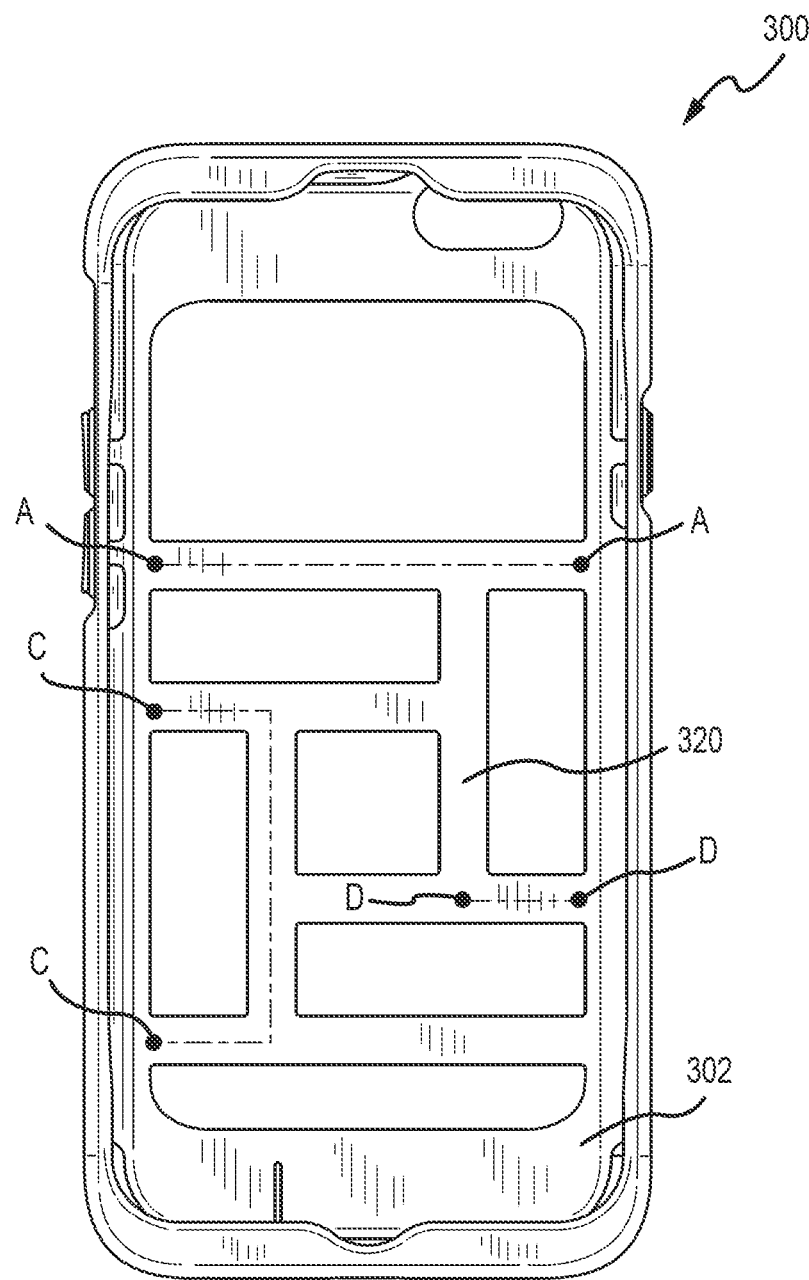
Figure 3D:
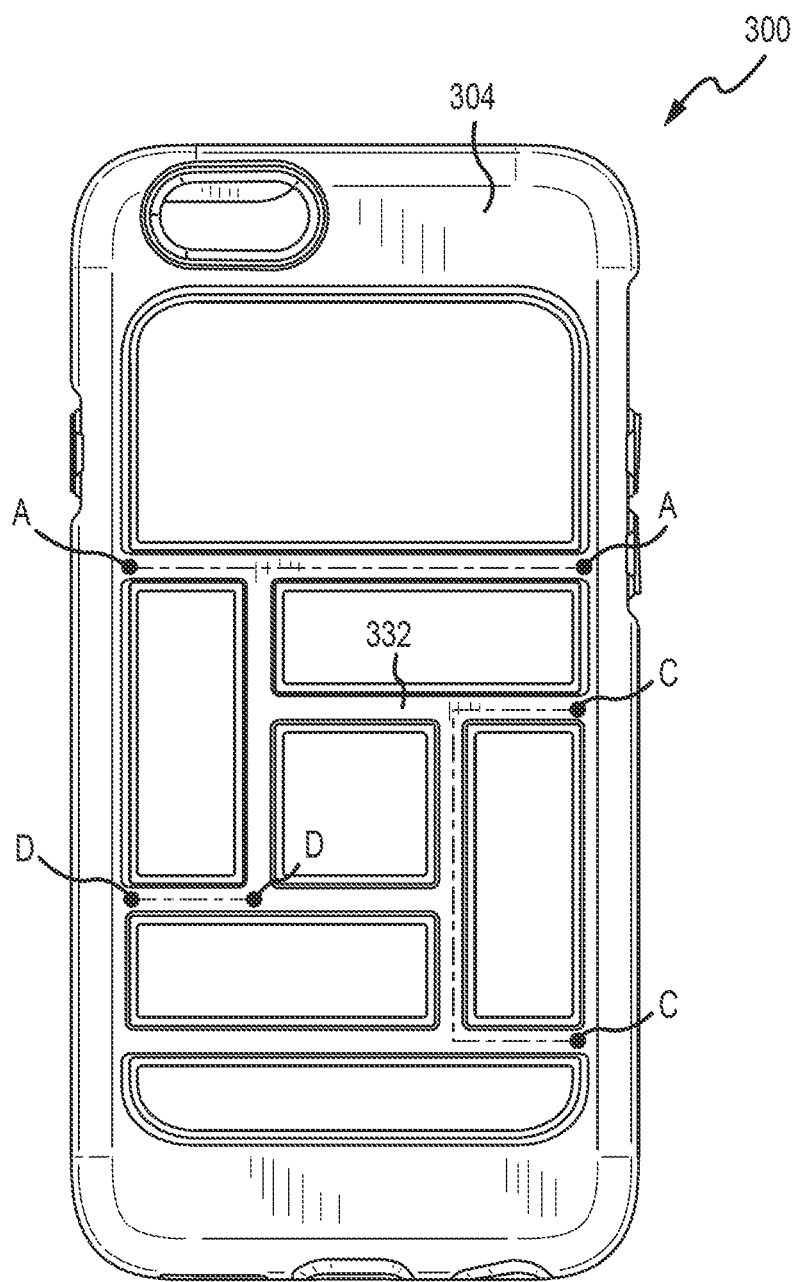
Figure 4A:
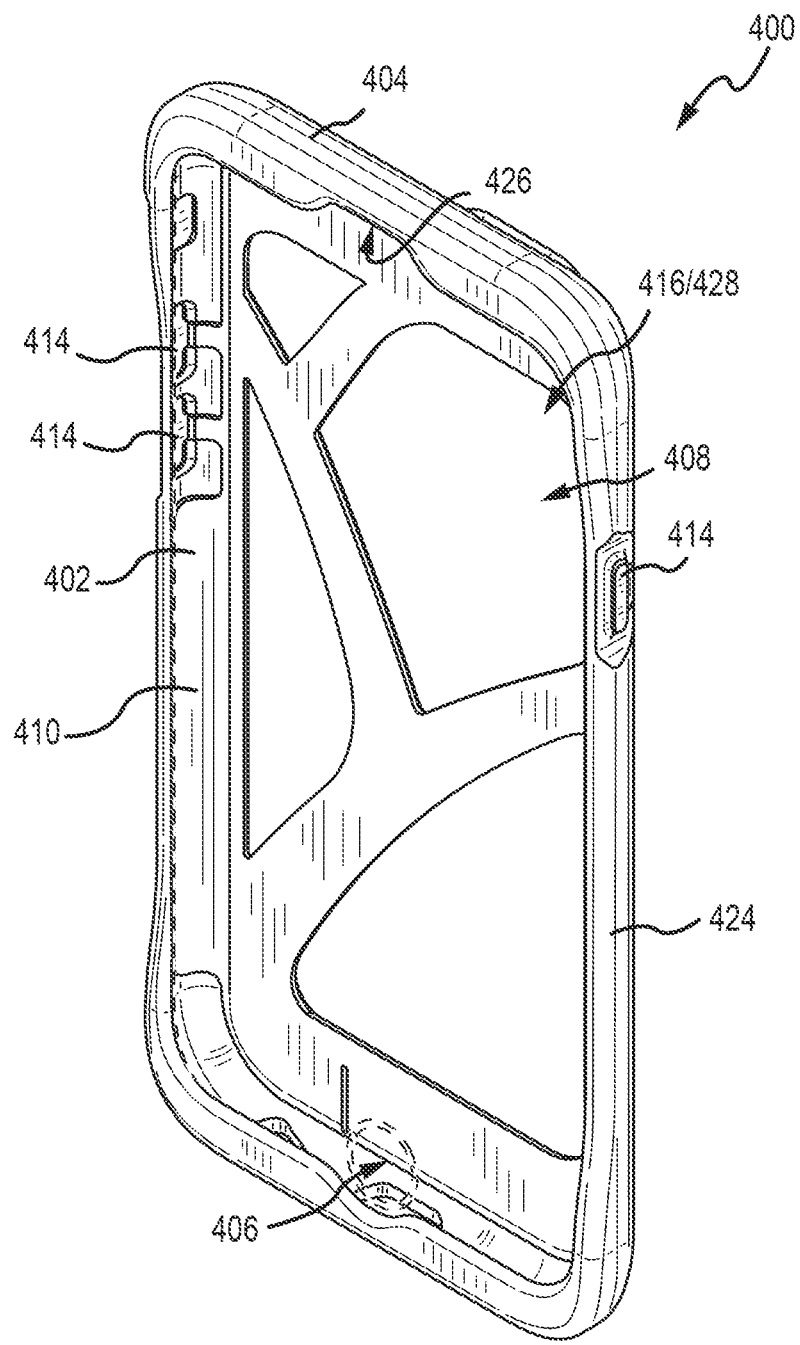
FIGS. 4A-4H are various views of a protective case for an electronic device in accordance with another embodiment of the technology.
Figure 4B:
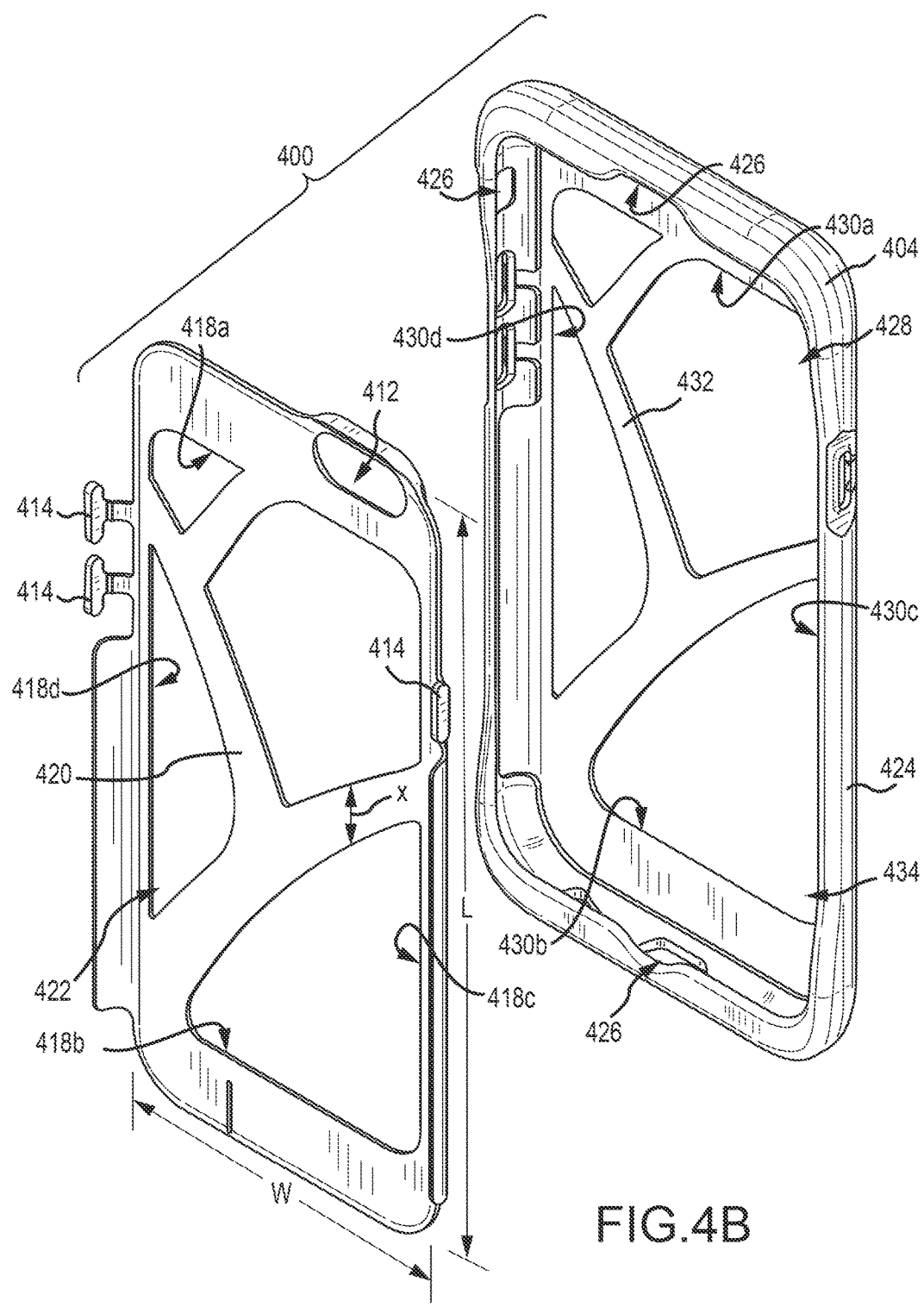
Figure 4C:
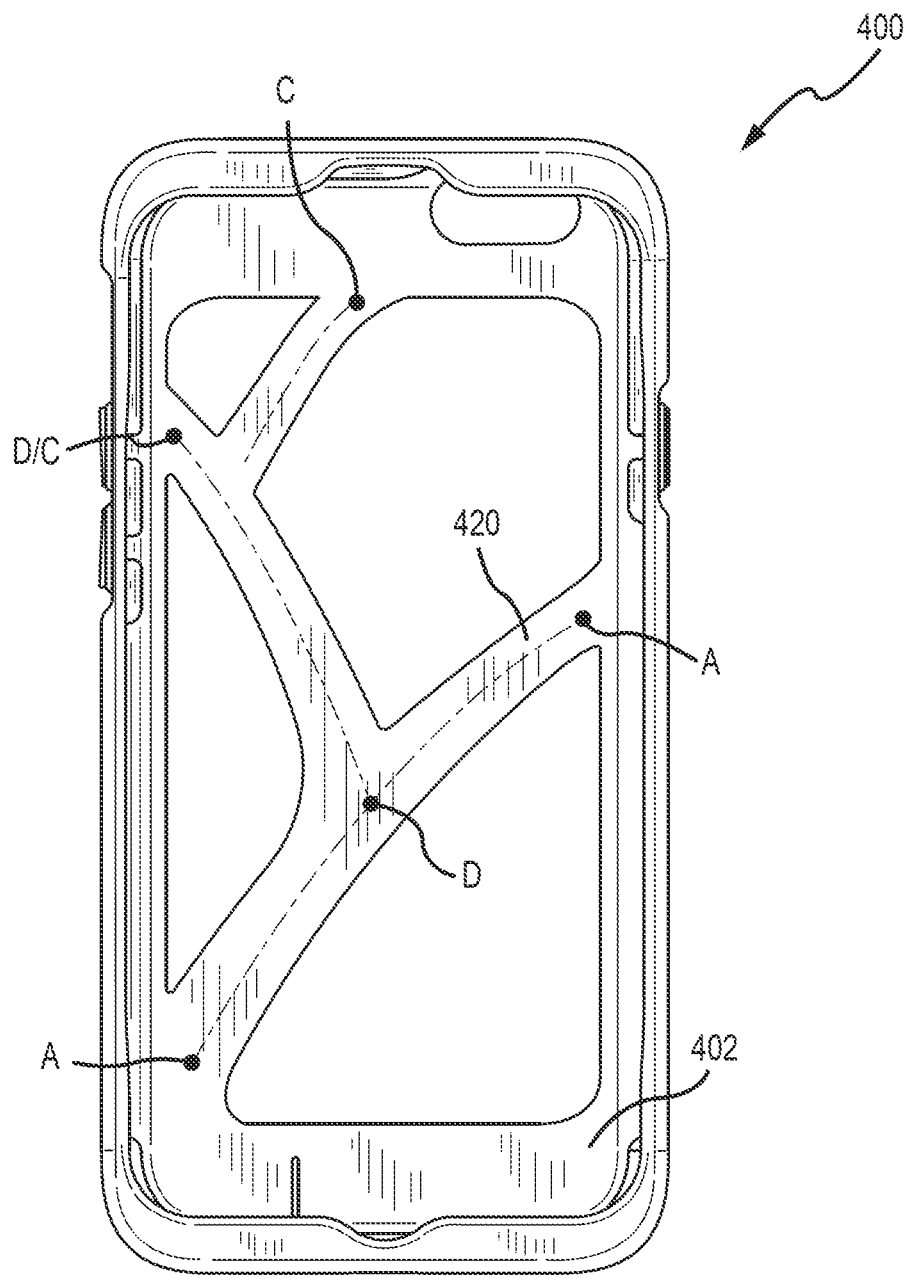
Figure 4D:
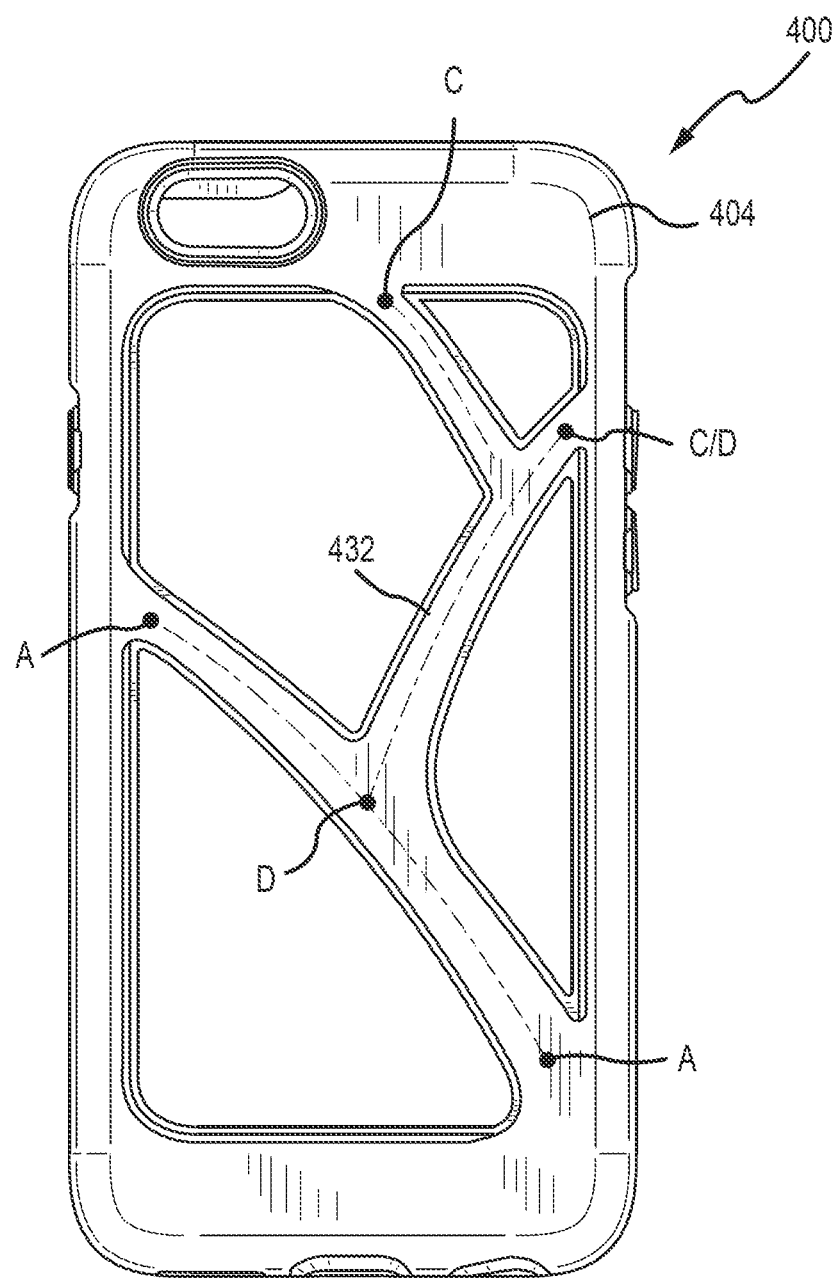
Figures 4E, 4F:
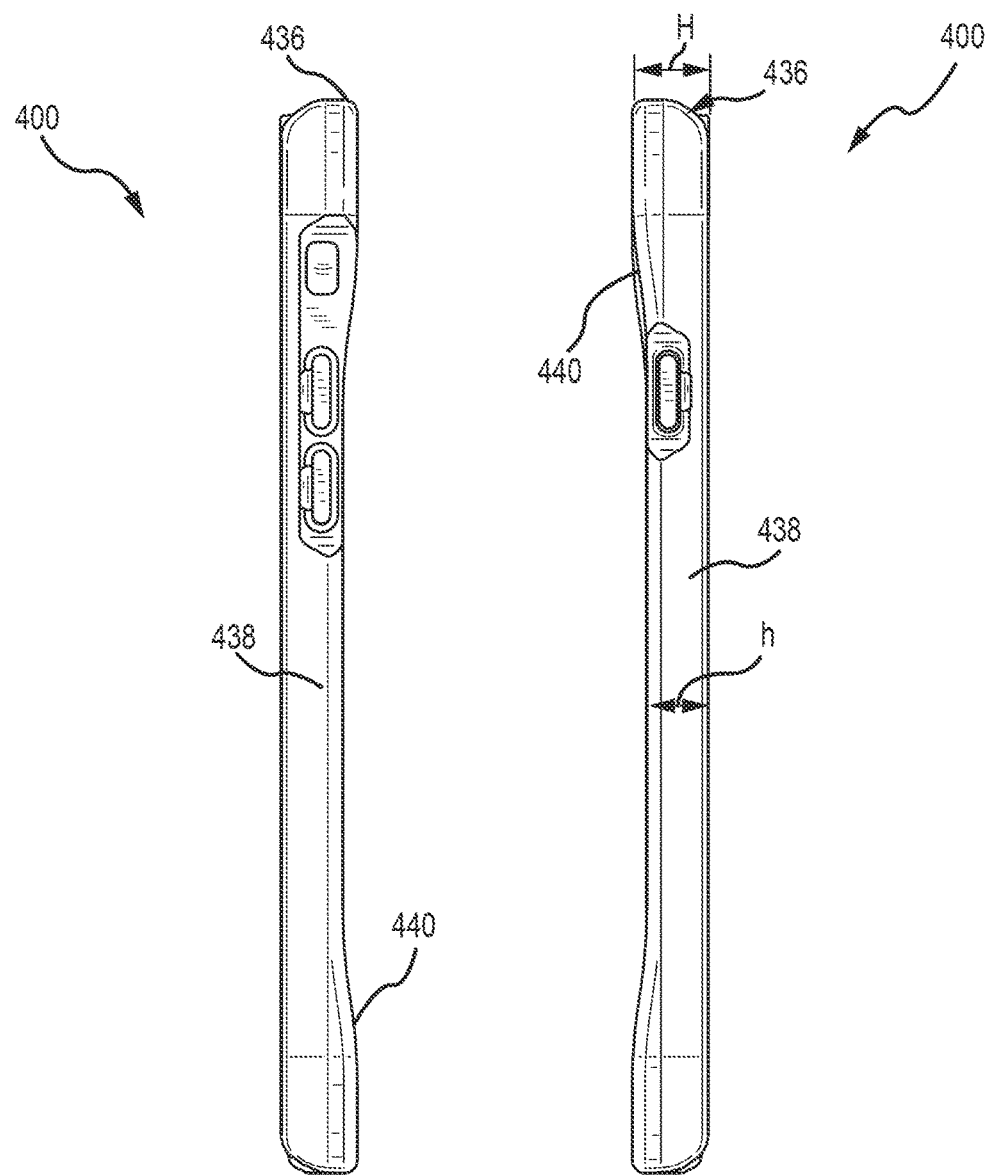
Figure 4G:
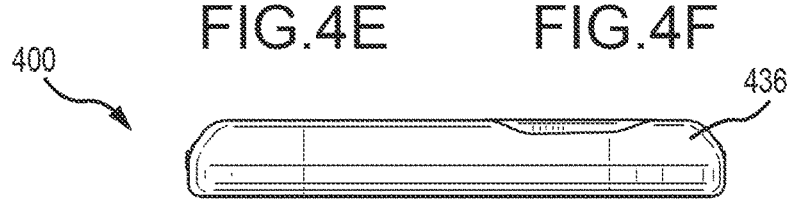
Figure 4H:
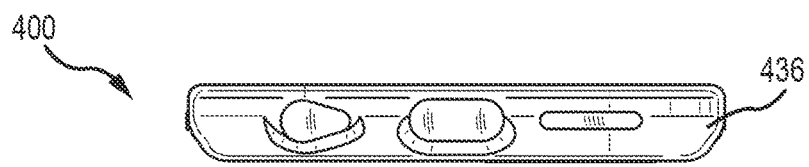

FIG. 2 is an enlarged partial side view of the protective case 100 of FIG. 1A. In this view, the tabs 114 of the inner layer are depicted, as well as openings 126 of the outer layer 104 that substantially surrounds the tabs 114. Enlarged portions of the depicted tabs 114 are aligned with two buttons on the smartphone that control volume (one button is configured to increase volume, while the other button is configured to decrease volume). As can be seen, openings 126 defined by the outer layer 104 substantially surround the tabs 114. The perimeters of the openings 126 substantially form a plane identified by P. The enlarged portions of the tabs 114 define an axis and are pitched at an angle α relative to the plane P. The pitch may be due to difference thickness of the enlarged portion along the axis, or the enlarged portion may be of a consistent thickness, but pitched. This pitch or misalignment gives the user the tactile feel of a rocker switch, allowing the user to more easily identify which button is which, and actuate the buttons appropriately. Unlike covers that cover smartphone buttons with a resilient layer, it has been discovered that a more rigid tab over a smartphone button more easily actuates that button.

FIGS. 3A-3H are various views of a protective case 300 for an electronic device in accordance with another embodiment of the technology. The protective case 300 depicted in these figures includes features substantially similar to the previously-presented embodiment, with regard to materials, layer configurations, tabs, etc. Accordingly, the components of this case 300 are identified by numbers similar to those utilized in FIGS. 1A-1H, above, but are not necessarily described further. The bridges 320/332 in these figures, however, are in the form of substantially straight bars. A number of different configurations of bridges 320 that completely or partially span the central opening 316 are depicted in the figures. For example, bridge 320 defined by path A-A spans the central opening 316 from a first edge to an opposing edge thereof. The bridge 320 defined by path C-C spans the central opening 316 from a first location to a second location on a single edge of the central opening 316. Additionally, the bridge 320 defined by path D-D spans the central opening 316 from an edge of the central opening to a second bridge 320 disposed within the central opening 316.

FIGS. 4A-4H are various views of a protective case 400 for an electronic device in accordance with another embodiment of the technology. The protective case 400 depicted in these figures includes features substantially similar to the previously-presented embodiments, with regard to materials, layer configurations, tabs, etc. Accordingly, the components of this case 400 are identified by numbers similar to those utilized in FIGS. 1A-1H, above, but are not necessarily described further. The bridges 420 in these figures, however, are in the form of curvilinear bars that have a varied width across their lengths. A number of different configurations of bridges 420 that completely or partially span the central opening 416 are depicted in the figures. For example, bridge 420 defined by path A-A spans the central opening 416 from a first edge to an opposing edge thereof. The bridge 420 defined by path B-B spans the central opening 416 from a first edge to an adjacent edge thereof. The bridge 420 defined by path C-C spans the central opening 416 from a first location to a second location on a single edge of the central opening 416. Additionally, the bridge 420 defined by path D-D spans the central opening 416 from an edge of the central opening 416 to a second bridge 420 disposed within the central opening 416.

Figure 5:
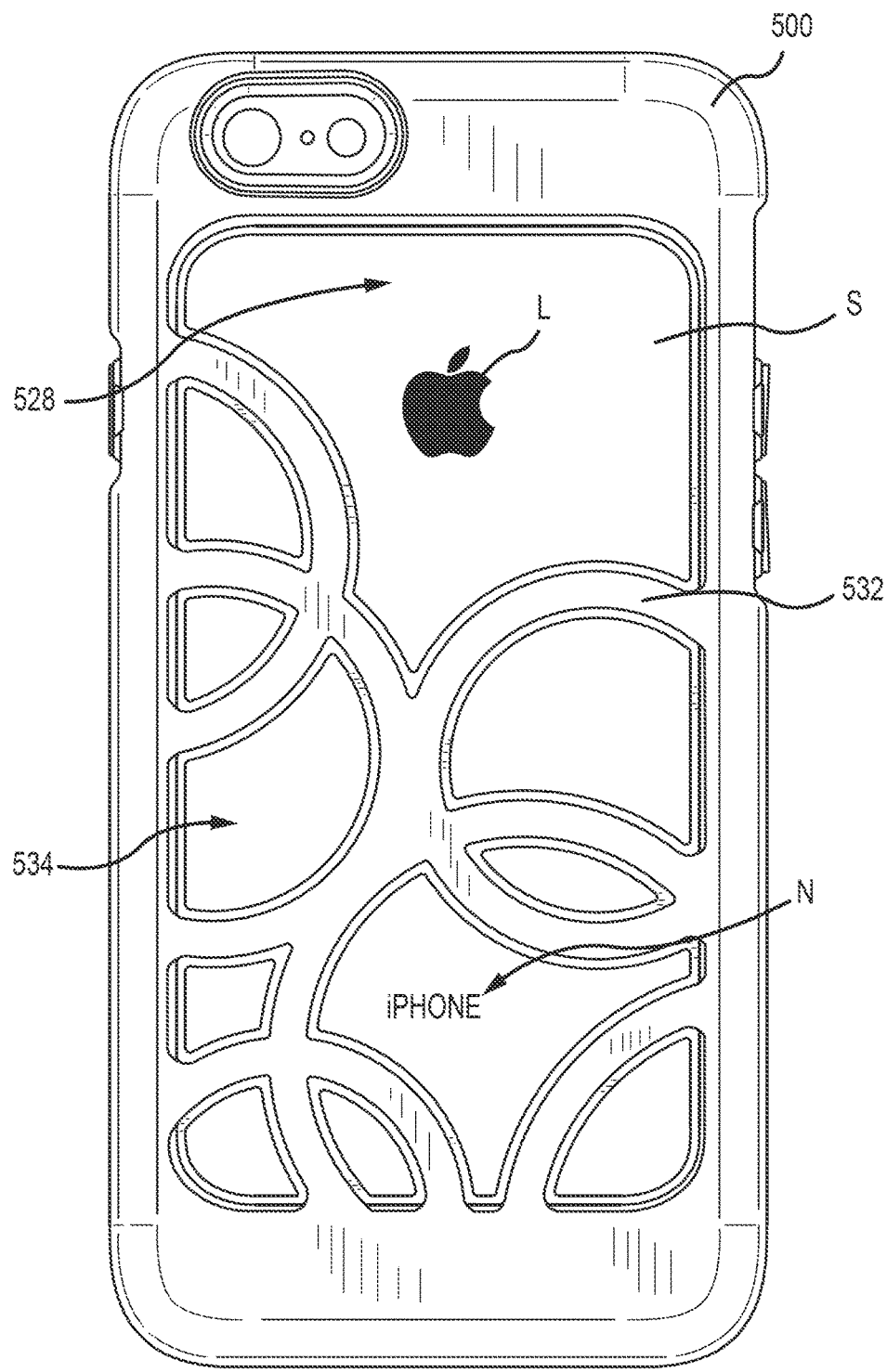
FIG. 5 is a rear view of an iPhone 6 smartphone disposed in a protective case.

FIG. 5 is a rear view of an iPhone 6 smartphone S disposed in a protective case 500. As described in more detail above, the case 500 includes a number of bridges 532 that span a central window 528 of the case 500. Between the bridges 532, a number of gaps 534 are defined. In the depicted embodiment, the gaps 534 are configured and arranged so as leave both the Apple™ logo L and iPhone™ name N visible. This visibility can help preserve brand recognition in the eye of the consumer.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A case for an electronic device, comprising:
a first panel, two short edge panels each having matching heights, and two long edge panels each having matching heights different than the heights of the two short edge panels, wherein the two long edge panels have a length greater than the two short edge panels, and wherein the two short edge panels and two long edge panels extend from the first panel;
each of the two short edge panels have a first height and each of the two long edge panels have a second height, wherein the second height is less than the first height;
an edge corner located at each intersection of the short and long edge panels, wherein the edge corners have a third height and include transitions to the second height of the long edge panels, and wherein the maximum height of each of the transitions is not greater than the third height of the edge corners and the minimum height of each of the transitions is not less than the second height of the long edge panels;
wherein the two short edge panels have only one height that continuously spans the entire distance between the corners; and
and wherein the two long edge panels have only one height that continuously spans the entire distance between the transitions of the edge corners.

2. The case of claim 1, wherein the transitions to the second height of the long edge panels defines one of a taper or a step.

3. The case of claim 1, wherein the third height of the edge corners is the same as the first height of the two short edge panels, and wherein the transitions to the height of the long edge panels are defined by one of a taper or step.

4. The case of claim 1, wherein the third height of the edge corners is greater than the first height of the short edge panels and includes a second transition to the first height of the short edge panels.

5. The case of claim 1, wherein the third height of the edge corners is the greater than the first height of the two short edge panels, and wherein the transitions to the height of the long edge panels are defined by one of a taper or a step.

6. The case of claim 1, wherein the third height of the edge corners is less than the first height of the short edge panels and includes a second transition to the first height of the short edge panels.

7. The case of claim 3, wherein the heights of the two long edge panels are symmetrical about the long axis of the case.

8. The case of claim 7, wherein the heights of the two short edge panels are symmetrical about the short axis of the case.

9. The case of claim 3, wherein at least one of the short edge panels or long edge panels further comprise one or more openings to uncover an element of an electronic device.

10. The case of claim 9, wherein at least one of the short edge panels or long edge panels further comprise one or more tabs that are aligned with one or more buttons associated with the electronic device.

11. The case of claim 10, wherein the first panel comprises a window to expose one of a name and a logo associated with the electronic device.

12. The case of claim 4, wherein the heights of the two long edge panels are symmetrical about the long axis of the case.

13. The case of claim 12, wherein the heights of the two short edge panels are symmetrical about the short axis of the case.

14. The case of claim 4, wherein at least one of the short edge panels or long edge panels further comprise one or more openings to uncover an element of an electronic device.

15. The case of claim 14, wherein at least one of the short edge panels or long edge panels further comprise one or more tabs that are aligned with one or more buttons associated with the electronic device.

16. The case of claim 15, wherein the first panel comprises a window to expose one of a name and a logo associated with the electronic device.

17. The case of claim 5, wherein the heights of the two long edge panels are symmetrical about the long axis of the case.

18. The case of claim 5, wherein the heights of the two short edge panels are symmetrical about the short axis of the case.

19. The case of claim 5, wherein at least one of the short edge panels or long edge panels further comprise one or more openings to uncover an element of an electronic device.

20. The case of claim 5, wherein at least one of the short edge panels or long edge panels further comprise one or more tabs that are aligned with one or more buttons associated with the electronic device.

21. The case of claim 19, wherein the first panel comprises a window to expose one of a name and a logo associated with the electronic device.

22. The case of claim 1, wherein the heights of the two long edge panels are symmetrical about the long axis of the case.

23. The case of claim 1, wherein the heights of the two short edge panels are symmetrical about the short axis of the case.

24. The case of claim 22, wherein the heights of the two short edge panels are symmetrical about the short axis of the case.

25. The case of claim 1, wherein at least one of the short edge panels or long edge panels further comprise one or more openings to uncover an element of an electronic device.

26. The case of claim 1, wherein at least one of the short edge panels or long edge panels further comprise one or more tabs that are aligned with one or more buttons associated with the electronic device.

27. The case of claim 1, wherein the first panel comprises a window to expose one of a name and a logo associated with the electronic device.

28. A case for an electronic device, comprising:
a first panel having a plurality of turned edges extending from the first panel;
the plurality of turned edges comprising upper and lower edges and a first and a second side edges;
the upper edge intersecting with both a first end of the first side edge and a first end of the second side edge defining a first and second corner;
the lower edge intersecting with a second end of the first side edge and a second end of the second side edge defining a third and fourth corner;
the upper and lower edges having a first, continuous height spanning the entire distance between the first and second corner and third and fourth corner, respectively;
wherein a change in height from the first and second corners to the first and second side edges is defined by a first transition, and another change in height from the first and second side edges to the third and fourth corners is defined by a second transition, and wherein the first and second transitions are defined by one of a taper or a step;
wherein the first and second side edges have a second, continuous height spanning the entire distance between the first and second transitions; and
wherein the second height of the first and second edges is less than the first height of the upper and lower edges.

29. The case of claim 28, wherein the first panel comprises a window to expose one of a name and a logo associated with an electronic device.

30. The case of claim 28, wherein the heights of the first and second side edges are symmetrical about the long axis of the case.

31. The case of claim 30, wherein the heights of the upper and lower edges are symmetrical about the short axis of the case.

32. The case of claim 28, wherein the first, second, third and fourth corners each have a height the same as the first height of the upper and lower edges.

33. The case of claim 28, wherein the first, second, third and fourth corners each have a height greater than the first height of the upper and lower edges.

34. The case of claim 30, wherein the first panel has a central opening with one or more bridges spanning the central opening.

35. The case of claim 30, wherein one or more of the upper and lower edges or the first or second side edges comprise an opening to uncover one or more elements of an electronic device.

36. The case of claim 30, wherein the first and second side edges do not have any other change in height other than the transitions to the second height.

37. The case of claim 35, wherein at least one of the upper or lower edges or one of the first and second side edges comprise one or more tabs that are aligned with one or more buttons associated with the electronic device.

38. The case of claim 31, wherein the first, second, third and fourth corners each have a height the same as the first height of the upper and lower edges.

39. The case of claim 31, wherein the first, second, third and fourth corners each have a height greater than the first height of the upper and lower edges.

40. The case of claim 31, wherein one or more of the upper and lower edges or the first or second side edges comprise an opening to uncover one or more elements of an electronic device.

41. The case of claim 31, wherein the first and second side edges do not have any other change in height other than the transitions to the second height.

42. The case of claim 36, wherein at least one of the upper or lower edges or one of the first and second side edges comprise one or more tabs that are aligned with one or more buttons associated with an electronic device.

43. The case of claim 33, wherein the heights of the two long edge panels are symmetrical about the long axis of the case.

44. The case of claim 33, wherein the heights of the two short edge panels are symmetrical about the short axis of the case.

45. The case of claim 43, wherein the heights of the two short edge panels are symmetrical about the short axis of the case.

46. The case of claim 43, wherein the first, second, third and fourth corners each have a height the same as the first height of the upper and lower edges.

47. The case of claim 43, wherein the first, second, third and fourth corners each have a height greater than the first height of the upper and lower edges.

48. The case of claim 43, wherein one or more of the upper and lower edges or the first or second side edges comprise an opening to uncover one or more elements of an electronic device.

49. The case of claim 45, wherein the first and second side edges do not have any other change in height other than the transitions to the second height.

50. The case of claim 43, wherein at least one of the upper or lower edges or one of the first and second side edges comprise one or more tabs that are aligned with one or more buttons associated with an electronic device.

* * * * *